United States Patent
Stieneker et al.

(10) Patent No.: US 6,316,550 B2
(45) Date of Patent: Nov. 13, 2001

(54) PROCESS FOR PREPARING THERMOPLASTIC MOLDING COMPOSITIONS

(75) Inventors: Axel Stieneker, Muenster; Radu Bordeianu, Marl; Thomas Neu, Duelmen; Harald Sturm; Wilhelm Friedrich Schmitt, both of Dorsten, all of (DE)

(73) Assignee: Vestolit GmbH & Co. KG, Marl (DE)

( * ) Notice: Subject to any disclaimer, the term of this patent is extended or adjusted under 35 U.S.C. 154(b) by 0 days.

(21) Appl. No.: 09/730,782

(22) Filed: Dec. 7, 2000

(30) Foreign Application Priority Data

Dec. 7, 1999 (DE) ............................................... 199 58 820

(51) Int. Cl.$^7$ .................................................. C08F 259/04
(52) U.S. Cl. ........................ 525/317; 525/318; 525/215; 525/235; 525/308
(58) Field of Search .................................. 525/317, 318, 525/215, 235, 308, 902

(56) References Cited

U.S. PATENT DOCUMENTS

| 3,763,279 | 10/1973 | Kelley. |
| 4,798,869 | 1/1989 | Sturm et al.. |
| 5,399,621 | * 3/1995 | Kohlhammer ........................ 525/263 |
| 5,605,972 | 2/1997 | Kohlhammer et al.. |

FOREIGN PATENT DOCUMENTS

| 1082734 | 5/1968 | (DE). |
| 0 600 478 A1 | 6/1994 | (EP). |

* cited by examiner

Primary Examiner—James J. Seidleck
Assistant Examiner—Olga Asinovsky
(74) Attorney, Agent, or Firm—Oblon, Spivak, McClelland, Maier & Neustadt, P.C.

(57) ABSTRACT

One embodiment of the present invention provides a process, which includes:

graft polymerizing a vinyl chloride monomer in suspension in the presence of a core-shell impact modifier;

wherein the core-shell impact modifier includes:

a core including polyvinyl chloride or vinyl chloride copolymers; and a shell including crosslinked alkyl (meth)acrylate homo- or copolymers.

Another embodiment of the present invention provides a thermoplastic polyvinyl chloride molding composition modified with an elastomer-containing core-shell modifier, prepared by a process, which includes graft polymerizing a vinyl chloride monomer in suspension in the presence of a core-shell impact modifier; wherein the core-shell impact modifier includes a core including polyvinyl chloride or vinyl chloride copolymers; and a shell including crosslinked alkyl (meth)acrylate homo- or copolymers. Another embodiment of the present invention provides a plastic profile, which includes the above-noted composition. Another embodiment of the present invention provides an article selected from the group including window frame, pipe, film, siding and panel, which includes the above-noted composition. By the present invention, a thermoplastic polyvinyl chloride molding composition is obtained that has improved impact strength, corner strength and optical properties.

21 Claims, No Drawings

PROCESS FOR PREPARING THERMOPLASTIC MOLDING COMPOSITIONS

BACKGROUND OF THE INVENTION

1. Field of the Invention

The invention relates to the preparation and processing of thermoplastic compositions based on vinyl chloride polymers with excellent notched impact strengths. The modification for notched impact strength uses a shell-type graft copolymer which is low in rubber and is added as a polymer latex prior to or during the polymerization of the vinyl chloride, whereupon the polyvinyl chloride (PVC) produced grafts onto the modifier latex particles. The component which improves impact strength is composed of a hard core and of a soft, rubber-like shell.

2. Discussion of the Background

The good price-performance ratio of polyvinyl chloride (PVC) and its versatility in use make it one of the most widely used polymers. However, PVC on its own is too brittle for many applications, e.g. window profiles. To improve the impact strength of PVC, vinyl chloride polymers have in the past been provided with a wide variety of modifiers. Examples of these which may be mentioned are polymeric impact modifiers of butadiene type, such as acrylonitrile-butadiene-styrene (ABS) and methyl methacrylatebutadiene-styrene (MBS); copolymers of ethylene with vinyl acetate (EVA); chlorinated polyolefins, such as chlorinated polyethylene (CPE); ethylenepropylene rubbers and polymers of acrylate type, such as homo- and copolymers of alkyl acrylates. The application DE 1,082,734, for example, describes a process for preparing impact-modified polyvinyl chloride. The polymer claimed is prepared by polymerizing vinyl chloride in aqueous suspension with the aid of suspension stabilizers and of organic or, respectively, inorganic activators, and the polymerization of the vinyl chloride takes place in the presence of aqueous emulsions, of polymers which have tough and resilient properties at room temperature and are present in amounts of from 2 to 25% by weight, based on solids. The polymers here may be homopolymers of acrylic or vinylic esters or, respectively, copolymers with other compounds.

A disadvantage of this process is that to produce profiles a very large amount of the expensive acrylate is required to achieve sufficiently high notched impact strength in, for example, a PVC profile.

Grafted or core-shell impact modifiers with a layer-like structure are also known in principle. DE 4,302,552 describes graft and core-shell copolymers with improved phase compatibility between graft base and the polymer phase grafted on. The graft and core-shell copolymers are prepared from a polymer phase a) containing peroxy groups and comprising from 0.01 to 20% by weight of a doubly olefinically unsaturated peroxy compound of the formula $H_2C=CH-O-CO-R^1-CO-O-O-CO-R^1-COO-CH=CH_2$ and contains from 80 to 99.99% by weight of one or more comonomers selected from the group consisting of (meth)acrylates of alcohols having from 1 to 10 carbon atoms, vinyl esters of saturated aliphatic carboxylic acids having from 2 to 10 carbon atoms, olefins, vinylaromatics, vinyl halides and/or vinyl ethers, and from, grafted onto this, a polymer phase b) which is prepared by grafting one or more comonomers selected from the group consisting of (meth)acrylates of alcohols having from 1 to 10 carbon atoms, vinyl esters of saturated aliphatic carboxylic acids having from 2 to 10 carbon atoms, olefins, vinylaromatics, vinyl halides and styrene, and also styrene derivatives, onto the polymer phase a) containing peroxy groups. A disadvantage of this process for preparing core-shell polymers is that concomitant use of an unstable comonomer containing peroxy groups is required in order to ensure phase compatibility between polymer phases a) and b), and care has to be taken that the peroxide functions are not destroyed. The text also describes the use as an impact modifier in plastics, albeit in solid form. This, however, is another disadvantage since it necessitates an additional work-up process, namely drying. The shell is moreover used in uncrosslinked form, and this results in some shearing away of the shell polymer during processing and is highly disadvantageous.

EP 0,600,478 also describes the preparation of a graft copolymer latex from core-shell dispersion particles with improved phase compatibility between core and shell, using a two-stage emulsion polymerization process. However, only crosslinked, elastomeric polymers are permissible in the first stage. In addition, the shell polymer has to have a glass transition temperature ($T_g$) above 20° C., and this would have an adverse effect for the use as impact modifier in thermoplastics.

There are also known core-shell modifiers for improving the notched impact strength of PVC, which have a hard core and a soft shell made from rubber-like material. For example U.S. Pat. No. 3,763,279 and DE 3,539,414 describe the preparation of polymer systems which have a hard, crosslinked core made from polystyrene and a soft, crosslinked polyacrylate shell. Disadvantages are firstly the relatively poor compatibility of the polystyrene core with the PVC matrix, the effect of which is especially adverse when welding PVC profiles which have been cut to the required dimensions. Secondly, these processes were optimized for transparency, and polystyrene therefore had to be used as core material. This is uneconomic, however, when transparency is not needed in the resultant semifinished product.

SUMMARY OF THE INVENTION

Accordingly, one object of the present invention is to develop a process which avoids the above-mentioned disadvantages.

This and other objects have been achieved by the present invention, the first embodiment of which provides a process, which includes:
graft polymerizing a vinyl chloride monomer in suspension in the presence of a core-shell impact modifier;
wherein the core-shell impact modifier includes:
a core including polyvinyl chloride or vinyl chloride copolymers; and
a shell including crosslinked alkyl (meth)acrylate homo- or copolymers.

Another embodiment of the present invention provides a thermoplastic polyvinyl chloride molding composition modified with an elastomer-containing core-shell modifier, prepared by a process, which includes:
graft polymerizing a vinyl chloride monomer in suspension in the presence of a core-shell impact modifier;
wherein the core-shell impact modifier includes:
a core including polyvinyl chloride or vinyl chloride copolymers; and
a shell including crosslinked alkyl (meth)acrylate homo- or copolymers.

Another embodiment of the present invention provides a plastic profile, which includes the above-noted composition.

Another embodiment of the present invention provides an article selected from the group including window frame, pipe, film, siding and panel, which includes the above-noted composition.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Surprisingly, it has now been found that improved properties can be achieved in impact-modified PVC by way of a reduced elastomer proportion in the impact modifier, which is prepared by way of a core-shell structure by replacing some of the rubber phase with a core made from cost-effective PVC.

The invention provides a novel process for preparing a thermoplastic polyvinyl chloride molding composition modified with an elastomer-containing core-shell modifier with improved impact strength and corner strength and with improved optical properties, such as surface gloss, and with, at the same time, a smaller proportion of the elastomer component than in conventional single-phase impact modifiers.

The core of the impact modifier is composed of polyvinyl chloride or of vinyl chloride copolymers, and the shell of the impact modifier is composed of crosslinked alkyl (meth) acrylate homo- or copolymers. The graft polymerization of the vinyl chloride monomer takes place by suspension polymerization processes known to the chemist and the engineer in the presence of the abovementioned core-shell modifier. The suspension polymerization is initiated by monomer-soluble free-radical initiators, such as those of peroxide type or azo compounds. Examples of peroxide initiators are diacyl peroxides, dialkyl peroxides, peroxydicarbonates and alkyl peresters, such as bis(2-methylbenzoyl) peroxide, di-tert-butyl peroxide, dilauroyl peroxide, acetyl benzoyl peroxide, dicumyl peroxide, diacetyl peroxydicarbonate and tert-butyl perpivalate, and an example of an azo initiator is azobis(isobutyronitrile). The type and amount of the initiator are selected in the usual way, and mixtures of initiators may also be used here. Amounts of from 0.05 to 1% by weight, more preferably 0.075 to 0.95%, more especially preferably 0.1 to 0.5%, of primary protective colloids, based on the total amount of the organic phase, may be added as suspending agents. Examples of these are the substantially water-soluble cellulose derivatives with viscosities (for 2% strength aqueous solutions) of from 25 to 3000 mPa·s, such as alkyl-, hydroxyalkyl-, alkylhydroxyalkyl- and carboxyalkylcellulose ethers, polyvinyl alcohol, partially hydrolyzed polyvinyl acetates, copolymers made from vinylpyrrolidone and from ethylenically unsaturated esters, and polyoxazolines. Known nonionic surfactants, e.g. fatty acid ethoxylates, alcohol ethoxylates, or fatty acid esters of polyols, or anionic surfactants, e.g. alkyl sulfates, alkyl- or alkylarylsulfonates, sorbitan monolaurate, or esters or half-esters of sulfosuccinic acid may also be added as suspension auxiliaries, in amounts of from 0.01 to 1.2 parts by weight, based on the total amount of the organic phase. Any other known auxiliary may also be used for carrying out the suspension polymerization (see, for example, Encyclopedia of Polymer Science and Technology, the entire contents of which are hereby incorporated by reference, the same as if set forth at length).

The core-shell modifier is prepared by emulsion or microsuspension polymerization and by techniques known from the literature (e.g. Kunststoffhandbuch Polyvinylchlorid {Plastics Handbook-Polyvinyl Chloride}, Vols. 1 & 2, 2nd Edition, Carl-Hanser Verlag, 1986, the entire contents of which are hereby incorporated by reference, the same as if set forth at length) to water in the presence of conventional dispersing agents and initiators, in two stages. In the first stage the PVC homo- or copolymer core is synthesized and in the second stage the elastomeric shell is synthesized in the presence of the core. The emulsion polymerization may preferably be initiated by suitable water-soluble free-radical generators. The amounts usually used are from 0.01 to 4% by weight, more preferably 0.05 to 3%, more especially preferably 0.075 to 2%, and most preferably 0.1 to 1%, based on the total weight of the monomers. Examples of the initiators used are hydrogen peroxide or peroxide derivatives, such as the persulfates or peroxodisulfates of ammonium, sodium or potassium, and these are decomposed thermally or with the aid of suitable reducing agents (as described, for example, in Houben-Weyl Vol. 14/1, pp. 263–297, the entire contents of which are hereby incorporated by reference, the same as if set forth at length). Examples of reducing agents include the following compounds: sodium sulfite, sodium hydrogen sulfite, sodium dithionite and ascorbic acid. Any of the conventional emulsifiers and protective colloids may be used as dispersing agents for the emulsion polymerization. The amounts are usually from 0.5 to 5% by weight, more preferably from 0.75 to 4%, more especially preferably from 0.9 to 3%, and most preferably from 1 to 2%, based on the total weight of the monomers. Examples of those suitable are anionic surfactants, such as alkyl sulfates with a chain length of from 8 to 20 carbon atoms, alkyl- or alkylarylsulfonates with comparable chain lengths, or esters or half-esters of sulfosuccinic acid. Alkyl polyglycol ethers or alkylaryl polyglycol ethers having from 1 to 30 ethylene oxide units are examples of nonionic surfactants which may be used. It is also possible, if desired, to use protective colloids, such as vinyl alcohol-vinyl acetate copolymers with a content of from 70 to 100 mol %, more preferably from 75 to 95%, more especially preferably from 80 to 90%, and most preferably from 83 to 88%, of vinyl alcohol units, polyvinylpyrrolidone with a molar mass of from 10,000 to 350,000 g/mol and hydroxyalkylcelluloses with a degree of substitution of from 1 to 4. Acids, bases or conventional buffer salts, such as alkali metal phosphates or alkali metal carbonates may be added to control the pH. Known molecular-weight regulators, such as mercaptans, aldehydes or chlorinated hydrocarbons, may also be used.

In the microsuspension process, vinyl chloride is finely dispersed by mechanical means in an aqueous phase in the presence of an emulsifier system prior to the polymerization. Suitable homogenizers are high-pressure jets, colloid mills, high-speed stirrers or ultrasound dispersers. Preferred primary emulsifiers are the ammonium or alkali metal salts of fatty acids, alkyl sulfates, alkylarylsulfonates and the ammonium or alkali metal salts of sulfosuccinic esters. Secondary emulsifiers, such as hydrocarbons, $C_{14}$–$C_{24}$ fatty alcohols, fatty acids, ethoxylated long-chain alcohols, carboxylic acids, halogenated hydrocarbons, substituted phenols, ethylene oxide/propylene oxide adducts or partial polyhydric alcohol esters of fatty acids stabilize the monomer/water interface and suppress the Ostwald ripening of the dispersion. The initiators used are the oil-soluble free-radical generators which are also usual in suspension polymerization (see above).

The proportion of core made from PVC in the impact modifier is from 5 to 80% by weight, preferably from 20 to 60% by weight, and the proportion of elastomer in the shell is from 20 to 95% by weight, preferably from 40 to 80% by weight. These ranges include all values and subranges therebetween, including 10, 12, 15, 22, 25, 30, 35, 45, 50, 55, 65, 70 and 75%.

The overall diameter of the core-shell modifier particles is from 50 to 800 nm, preferably from 60 to 400 nm. These ranges include all values and subranges therebetween, including 65, 70, 100, 150, 200, 225, 275, 325, 400, 550, 600, 675 and 750 nm.

Preferably, the core of the modifier is composed of pure PVC or of a VC copolymer with at least 50 parts of vinyl chloride (based on the total amount of monomer).

The shell of the impact modifier is composed of an alkyl (meth)acrylate homo- or copolymer with a glass transition temperature <10° C., preferably <−10° C., crosslinked with a comonomer which has a functionality of two or more and nonconjugated double bonds. Possible monomers for the shell of the impact modifier are (meth)acrylates with an ester group chain length of from $C_2$ to $C_{14}$, preferably from $C_4$ to $C_8$, as in, for example, the n-butyl, isobutyl, n-hexyl, n-octyl or 2-ethylhexyl groups. The crosslinking agents used in synthesizing the elastomer component may be compounds which are copolymerizable with the particular shell monomer used and which have at least two nonconjugated double bonds, e.g. divinylbenzene, vinyl esters of (meth)acrylic acid, allyl esters of (meth)acrylic acid, diallyl esters of phthalic acid, maleic acid, etc., triallyl cyanurate, or di(meth)acrylates of polyhydric alcohols, for example trimethylolpropane, butanediol, glycerol, etc.

An additional compatibilizing layer, composed of poly (meth)acrylates with a glass transition temperature >25° C., preferably >70° C., is polymerized onto the shell of the core-shell impact modifier. The proportion of this layer is not more than 50% by weight, based on the entire shell.

The proportion of core-shell modifier, based on the entire monomer, is from 2 to 80% by weight, preferably from 3 to 50% by weight.

The polymers prepared according to the invention are particularly suitable for thermoplastic molding, i.e. molding using heat and pressure, e.g. by calendering, extruding, thermoforming, injection molding or hot press molding, with or without plasticizer, for example to produce profiles for window frames or to give films, etc.

EXAMPLES

Having generally described this invention, a further understanding can be obtained by reference to certain specific examples which are provided herein for purposes of illustration only and are not intended to be limiting unless otherwise specified.

Example 1

This example describes the preparation of an impact-modified PVC based on a core-shell modifier with 30% by weight of PVC and 70% by weight of i polybutyl acrylate.
1. Synthesis of the Impact Modifier
1.1. Synthesis of the PVC Core by Emulsion Polymerization 79.57 kg of deionized water, 978.8 g of a 7.5% strength potassium myristate solution, 1.036 g of copper nitrate, 3.329 g of sodium sulfite, 10.82 g of tetrasodium diphosphate and 1.779 kg of a 1% strength KOH solution are placed in a 235 liter reactor.

The reactor is heated via its jacket, with stirring. Once the polymerization temperature of 53° C. has been reached, 21.55 g of potassium peroxodisulfate are added. The reactor is then flushed with nitrogen and evacuated. 86.36 kg of vinyl chloride are then metered in.

The reaction mixture is homogenized and the feed of a 0.25% strength $H_2O_2$ solution is begun. 18.56 kg of a 7.5% strength potassium myristate solution and 2.712 kg of deionized water are then metered in continuously and in parallel with the initiator feed during the entire polymerization procedure.

The polymerization is completed following a reduction in pressure and continued stirring for 1 h. The PVC latex is degassed and cooled. The solids content is 44.8%. Electron microscopy gives an average latex particle size, based on volume, of 110 nm.
1.2. Synthesis of the Core-shell Modifier by Emulsion Polymerization 56.5 kg of deionized water and 33.48 kg of the PVC latex synthesized in 1.1 are placed in a 235 liter reactor with continuous stirring. The reactor is then flushed with nitrogen and heated to the polymerization temperature of 80° C. The feeds of 34.12 kg of n-butyl acrylate, 892.9 g of allyl methacrylate, 15.0 kg of a 1% strength potassium myristate solution and 10 kg of a 0.5% strength ammonium peroxodisulfate solution are then begun simultaneously. The polymerization is completed after 300 min.

The resultant core-shell modifier latex has a core/shell weight ratio of 30/70 and an average particle size of about 175 nm, based on volume.
2. Synthesis of the Impact-modified PVC by Suspension Polymerization 53.46 kg of water, 12.59 kg of the core-shell modifier latex prepared in 1.2, 119.6 g of methylhydroxypropylcellulose, 16.91 g of lauroyl peroxide and 14.1 g of dicetyl peroxodicarbonate are placed in a 150 liter reactor. The reactor is flushed with nitrogen and evacuated, the stirrer is then switched on and the reactor heated to 60° C. During the heating phase 43.76 kg of vinyl chloride are added in a single portion.

The polymerization is completed following a reduction in pressure and continued stirring for 1 h. The reactor is degassed and the resultant PVC is filtered off from the dispersion and dried in a fluidized-bed dryer.

The powder is then homogenized, blended with suspension PVC to give a core-shell modifier content of 6.5% and further processed in a mixing specification for window profile in a Krauss-Maffei KMD 90 extruder at a screw rotation rate of 15 rpm. The properties measured on the profile are given in Table 1.

Example 2

This example describes the preparation of an impact-modified PVC based on a core-shell modifier with 40% by weight of PVC and 60% by weight of polybutyl acrylate.
1. Synthesis of the Impact Modifier
1.1. Synthesis of the PVC Core by Emulsion Polymerization 82.45 kg of deionized water, 806.1 g of a 7.5% strength potassium myristate solution, 1.036 g of copper nitrate, 3.329 g of sodium sulfite, 10.82 g of tetrasodium diphosphate and 1.779 kg of a 1% strength KOH solution are placed in a 235 liter reactor.

The reactor is heated via its jacket, with stirring. Once the polymerization temperature of 53° C. has been reached, 21.55 g of potassium peroxodisulfate are added. The reactor is then flushed with nitrogen and evacuated. 86.36 kg of vinyl chloride are then metered in.

The reaction mixture is homogenized and the feed of a 0.25% strength $H_2O_2$ solution is begun. 18.56 kg of a 7.5% strength potassium myristate solution are then metered in continuously and in parallel with the initiator feed during the entire polymerization procedure.

The polymerization is completed following a reduction in pressure and continued stirring for 1 h. The PVC latex is degassed and cooled. The solids content is 44.7%. Electron microscopy gives an average latex particle size, based on volume, of 136 nm.

1.2. Synthesis of the Core-shell Modifier by Emulsion Polymerization 50.24 kg of deionized water and 44.74 kg of the PVC latex synthesized in 1.1 are placed in a 235 liter reactor with continuous stirring. The reactor is then flushed with nitrogen and heated to the polymerization temperature of 80° C. The feeds of 29.25 kg of n-butyl acrylate, 765.3 g of allyl methacrylate, 15.0 kg of a 1% strength potassium myristate solution and 10 kg of a 0.5% strength ammonium peroxodisulfate solution are then carried out simultaneously. The polymerization is completed after 300 min.

The resultant core-shell modifier latex has a core/shell weight ratio of 40/60 and an average particle size of about 170 nm, based on volume.

2. Synthesis of the Impact-modified PVC by Suspension Polymerization 240.5 kg of water, 53.74 kg of the core-shell modifier latex prepared in 1.2, 532.6 g of methylhydroxypropylcellulose, 53.8 g of lauroyl peroxide and 44.85 g of dicetyl peroxodicarbonate are placed in a 650 liter reactor. The reactor is flushed with nitrogen and evacuated, the stirrer is then switched on and the reactor heated to 60° C. During the heating phase 194.9 kg of vinyl chloride are added in a single portion.

The polymerization is completed following a reduction in pressure and continued stirring for 1 h. The reactor is degassed and the resultant PVC is filtered off from the dispersion and dried in a fluidized-bed dryer.

The powder is then homogenized, blended with suspension PVC to give a core-shell modifier content of 6.5% and further processed in a mixing specification for window profile in a Krauss-Maffei KMD 90 extruder at a screw rotation rate of 15 rpm. The properties measured on the profile are given in Table 1.

Example 3

This example describes the preparation of an impact-modified PVC based on a core-shell modifier with 50% by weight of PVC and 50% by weight of i polybutyl acrylate.

1. Synthesis of the Impact Modifier 1.1. Synthesis of the PVC Core by Emulsion Polymerization The PVC core is synthesized as in Example 1 and the solids content of the PVC dispersion is adjusted to 42.5% by weight.

1.2. Synthesis of the Core-shell Modifier by Emulsion Polymerization 41.16 kg of deionized water and 58.82 kg of the PVC latex synthesized in 1.1 are placed in a 235 liter reactor with continuous stirring. The reactor is then flushed with nitrogen and heated to the polymerization temperature of 80° C. The feeds of 24.37 kg of n-butyl acrylate, 637.7 g of allyl methacrylate and 10 kg of a 0.5% strength ammonium peroxodisulfate solution are then begun simultaneously. The polymerization is completed after 300 min.

The resultant core-shell modifier latex has a core/shell weight ratio of 50/50 and an average particle size of about 125 nm, based on volume.

2. Synthesis of the Impact-modified PVC by Suspension Polymerization 239.1 kg of water, 55.21 kg of the core-shell modifier latex prepared in 1.2, 852 g of a vinyl alcohol-vinyl acetate copolymer, 53.8 g of lauroyl peroxide and 44.85 g of dicetyl peroxodicarbonate are placed in a 650 liter reactor.

The reactor is flushed with nitrogen and evacuated, the stirrer is then switched on and the reactor heated to 60° C. During the heating phase 239.1 kg of vinyl chloride are added in a single portion.

The polymerization is completed following a reduction in pressure and continued stirring for 1 h. The reactor is degassed and the resultant PVC is filtered off from the dispersion and dried in a fluidized-bed dryer.

The powder is then homogenized, blended with suspension PVC to give a core-shell modifier content of 6.5% and further processed in a mixing specification for window profile in a Krauss-Maffei KMD 90 extruder at a screw rotation rate of 15 rpm. The properties measured on the profile are given in Table 1.

Example 4

This example describes the preparation of an impact-modified PVC based on a core-shell modifier with 50% by weight of PVC and 70% by weight of polybutyl acrylate, and an additional compatibilizing layer made from polymethyl methacrylate.

1.1. Synthesis of the PVC Core by Emulsion Polymerization

The PVC core is synthesized as in Example 1 and the solids content of the PVC dispersion is adjusted to 41.5% by weight.

1.2. Synthesis of the Core-shell Modifier by Emulsion Polymerization 10.2 kg of deionized water and 6.265 kg of the PVC latex synthesized in 1.1 are placed in a 40 liter reactor with continuous stirring. The reactor is then flushed with nitrogen and heated to the polymerization temperature of 80° C. The feeds of 5.054 kg of n-butyl acrylate, 123.8 g of allyl methacrylate, 1.733 kg of a 1% strength potassium myristate solution and 1.733 kg of a 0.5% strength ammonium peroxodisulfate solution are then begun simultaneously. After 180 min of feed time the reactor is stirred for a further 60 min. and 891.8 g of methyl methacrylate are then added within a period of 30 min. The addition of initiator continues for the entire polymerization time. The polymerization is completed after 330 min.

2. Synthesis of the Impact-modified PVC by Suspension Polymerization 53.6 kg of water, 12.43 kg of the core-shell modifier latex (solid content: 32.7%) prepared in 1.2, 124.3 g of a vinyl alcohol-vinyl acetate copolymer, 16.91 g of lauroyl peroxide and 14.1 g of dicetyl peroxodicarbonate are placed in a 150 liter reactor. The reactor is flushed with nitrogen and evacuated, the stirrer is then switched on and the reactor heated to 60° C. During the heating phase 43.76 kg of vinyl chloride are added in a single portion.

The polymerization is completed following a reduction in pressure and continued stirring for 1 h. The reactor is degassed and the resultant PVC is filtered off from the dispersion and dried in a fluidized-bed dryer.

Comparative Example

This example describes the preparation of an impact-modified PVC based on a polybutyl acrylate modifier.

1. Synthesis of the Polybutyl Acrylate Modifier by Emulsion Polymerization 64.77 kg of deionized water, 2.09 kg of butyl acrylate, 20.9 g of diallyl phthalate, 1.393 kg of a 7.5% strength potassium myristate solution and 19.39 g of ammonium peroxodisulfate are placed in a 235 liter reactor. The reactor is flushed with nitrogen and the mixture is heated to 80° C., with stirring. After 1 h of polymerization time, 60.61 kg of butyl acrylate, 612.4 g of diallyl phthalate and 52.88 kg of a 1% strength potassium myristate solution are metered in at 80° C. over a period of 420 min.

This gives a polybutyl acrylate latex with a solids content of 33.4% and an average particle size of 175 nm, based on volume.

2. Synthesis of the Impact-modified PVC by Suspension Polymerization 240 kg of water, 54.22 kg of the modifier latex prepared under 1., 852 g of a vinyl alcohol-vinyl acetate copolymer, 53.8 g of lauroyl peroxide and 44.85 g of diecetyl peroxodicarbonate are placed in a 650 liter reactor. The reactor is flushed with nitrogen and evacuated. The stirrer is then switched on and the mixture heated to 60° C. During the heating phase 194.9 kg of vinyl chloride are added in a single portion.

The properties of the polymers worked up from Examples 1 to 4 are listed in Table 1.

TABLE 1

Properties of Core-Shell-Modified PVC Grades

| Product of experiments | Modifier content in the composition, % | | Post-shrinkage, % (dimensional change after heat-ageing, DIN EN 479) | | Ball drop, m (DIN EN 477) | Notched impact strength, kJ/m² (DIN 53753) | Corner strength, kN (DIN EN 514) | Gloss (DIN 67530) | |
|---|---|---|---|---|---|---|---|---|---|
| | Overall | Rubber phase | Exterior | Interior | | | | Interior | Exterior |
| Comparative Example | 6.5 | 6.5 | 1.55 | 1.85 | 2.0 | 64 | 7300 | 34–37 | 40–49 |
| Example 1 | 6.5 | 4.55 | 1.40 | 1.50 | 2.0 | 70 | 7630 | 50–64 | 49–58 |
| Example 2 | 6.5 | 3.9 | 1.20 | 1.40 | 2.0 | 68 | 7925 | 61–71 | 54–68 |
| Example 3 | 6.5 | 3.25 | 1.30 | 1.50 | 2.0 | 63 | 7800 | 58–68 | 51–64 |
| Example 4 | 6.5 | 3.79 | 1.30 | 1.40 | 2.0 | 68 | 7600 | 58–62 | 57–69 |

This application is based on German patent application No. 199 58 820.1, filed Dec. 7, 1999, the entire contents of which are hereby incorporated by reference, the same as if set forth at length.

Obviously, numerous modifications and variations of the present invention are possible in light of the above teachings. It is therefore to be understood that within the scope of the appended claims, the invention may be practiced otherwise than as specifically described herein.

What is claimed is:

1. A process, comprising:
    graft polymerizing a vinyl chloride monomer in suspension in the presence of a core-shell impact modifier;
    wherein said core-shell impact modifier comprises:
        a core comprising polyvinyl chloride or vinyl chloride copolymers; and
        a shell comprising crosslinked alkyl (meth)acrylate homo- or copolymers.

2. The process as claimed in claim 1, wherein said core-shell impact modifier is prepared by a two-stage emulsion or microsuspension polymerization, wherein a first stage comprises synthesizing said polyvinyl chloride homo- or copolymer core; and wherein a second stage comprising synthesizing said shell in the presence of said core.

3. The process as claimed in claim 1, wherein a proportion of said core in said core-shell impact modifier is from 5 to 80% by weight.

4. The process as claimed in claim 1, wherein a proportion of said shell in said core-shell impact modifier is from 20 to 95% by weight.

5. The process as claimed in claim 1, wherein the proportion of said core in said core-shell impact modifier is from 20 to 60% by weight and that of said shell is from 40 to 80% by weight.

6. The process as claimed in claim 1, wherein said core-shell impact modifier is in the form of particles, and wherein the overall diameter of said particles is from 50 to 800 nm.

7. The process as claimed in claim 1, wherein said core-shell impact modifier is in the form of particles, and wherein the overall diameter of said particles is from 60 to 400 nm.

8. The process as claimed in claim 1, wherein said core comprises essentially 100% polyvinyl chloride.

9. The process as claimed in claim 1, wherein said core comprises a vinyl chloride copolymer with at least 50% by weight of vinyl chloride.

10. The process as claimed in claim 1, wherein said shell comprises at least one alkyl (meth)acrylate homo- or copolymer with a glass transition temperature <10° C., crosslinked with a comonomer which comprises two or more nonconjugated double bonds.

11. The process as claimed in claim 1, wherein said shell comprises at least one alkyl (meth)acrylate homo- or copolymer with a glass transition temperature <−10° C., crosslinked with a comonomer which comprises two or more nonconjugated double bonds.

12. The process as claimed in claim 1, further comprising polymerizing, onto said shell of said core-shell impact modifier, at least one compatibilizing layer comprising at least one poly(meth)acrylate with a glass transition temperature >25° C.

13. The process as claimed in claim 1, further comprising polymerizing, onto said shell of said core-shell impact modifier, at least one compatibilizing layer comprising at least one poly(meth)acrylate with a glass transition temperature >25° C., and wherein a proportion of said compatibilizing layer is not more than 50% by weight, based on the total weight of said shell.

14. The process as claimed in claim 1, further comprising polymerizing, onto said shell of said core-shell impact modifier, at least one compatibilizing layer comprising at least one poly(meth)acrylate with a glass transition temperature >70° C.

15. The process as claimed in claim 1, further comprising polymerizing, onto said shell of said core-shell impact modifier, at least one compatibilizing layer comprising at least one poly(meth)acrylate with a glass transition temperature >70° C., and wherein a proportion of said compatibilizing layer is not more than 50% by weight, based on the total weight of said shell.

16. The process as claimed in claim 1, wherein said core-shell impact modifier is present in an amount of 2 to 80% by weight, based on the total amount of said monomer.

17. The process as claimed in claim 1, wherein said core-shell impact modifier is present in an amount of 3 to 50% by weight, based on the total amount of said monomer.

18. The process as claimed in claim 1, further comprising at least one processing step selected from the group consisting of drying, filtering, molding using heat and pressure, calendering, extruding, thermoforming, injection molding, hot press molding and combinations thereof.

19. A thermoplastic polyvinyl chloride molding composition modified with an elastomer-containing core-shell modifier, prepared by a process comprising:

graft polymerizing a vinyl chloride monomer in suspension in the presence of a core-shell impact modifier;

wherein said core-shell impact modifier comprises:
  a core comprising polyvinyl chloride or vinyl chloride copolymers; and
  a shell comprising crosslinked alkyl (meth)acrylate homo- or copolymers.

20. A plastic profile, comprising the composition as claimed in claim 19.

21. An article selected from the group consisting of window frame, pipe, film, siding and panel, comprising the composition as claimed in claim 19.

* * * * *

UNITED STATES PATENT AND TRADEMARK OFFICE
CERTIFICATE OF CORRECTION

PATENT NO. : 6,316,550 B2
DATED : November 13, 2001
INVENTOR(S) : Axel Stieneker et al.

It is certified that error appears in the above-identified patent and that said Letters Patent is hereby corrected as shown below:

<u>Column 1,</u>
Line 14, "produced" should read -- produces --.

<u>Column 2,</u>
Line 21, "($T_g$)" should read -- ($T_g$) --.

<u>Column 3,</u>
Line 24, "(meth)" should read -- (meth)- --.

<u>Column 5,</u>
Line 28, "poly" should read -- poly- --.

<u>Column 8,</u>
Line 21, "polym-" should read -- poly- --.
Line 22, "ethyl" should read -- methyl --.

UNITED STATES PATENT AND TRADEMARK OFFICE
CERTIFICATE OF CORRECTION

PATENT NO.    : 6,316,550 B2
DATED         : November 13, 2001
INVENTOR(S)   : Axel Stieneker et al.

It is certified that error appears in the above-identified patent and that said Letters Patent is hereby corrected as shown below:

Column 9,
Table 1, delete the existing Table 1 and replace with the following new Table 1:

TABLE 1

Properties of Core-Shell-Modified PVC Grades

| | Mechanical properties | | | | | | | |
|---|---|---|---|---|---|---|---|---|
| | Modifier content in the composition, % | | Post-shrinkage, % (dimensional change after heat-aging) | | Ball drop, | Notched impact strength, | Corner strength, kN | Gloss | |
| Product of experiments | Overall | Rubber phase | DIN EN 479) Exterior Interior | | m (DIN EN 477) | kJ/m² (DIN 53753) | (DIN EN 514) | (DIN 67530) Interior Exterior | |
| Comparative Example | 6.5 | 6.5 | 1.55 | 1.85 | 2.0 | 64 | 7300 | 34-37 | 40-49 |
| Example 1 | 6.5 | 4.55 | 1.40 | 1.50 | 2.0 | 70 | 7630 | 50-64 | 49-58 |
| Example 2 | 6.5 | 3.9 | 1.20 | 1.40 | 2.0 | 68 | 7925 | 61-71 | 54-68 |
| Example 3 | 6.5 | 3.25 | 1.30 | 1.50 | 2.0 | 63 | 7800 | 58-68 | 51-64 |
| Example 4 | 6.5 | 3.79 | 1.30 | 1.40 | 2.0 | 68 | 7600 | 58-62 | 57-69 |

Line 63, "comprising" should read -- comprises --.

Signed and Sealed this

Seventeenth Day of December, 2002

JAMES E. ROGAN
*Director of the United States Patent and Trademark Office*